United States Patent Office 3,144,313
Patented Aug. 11, 1964

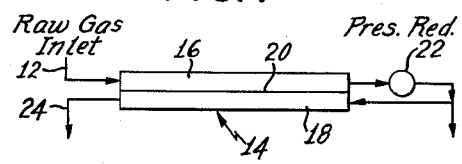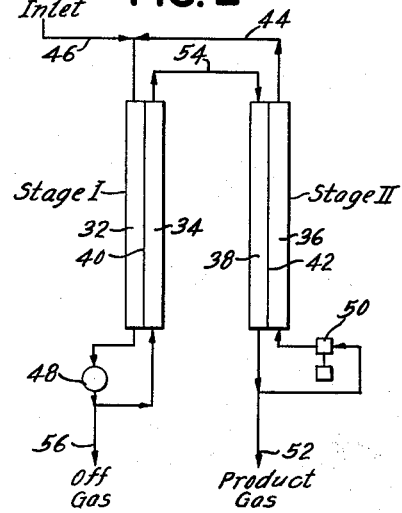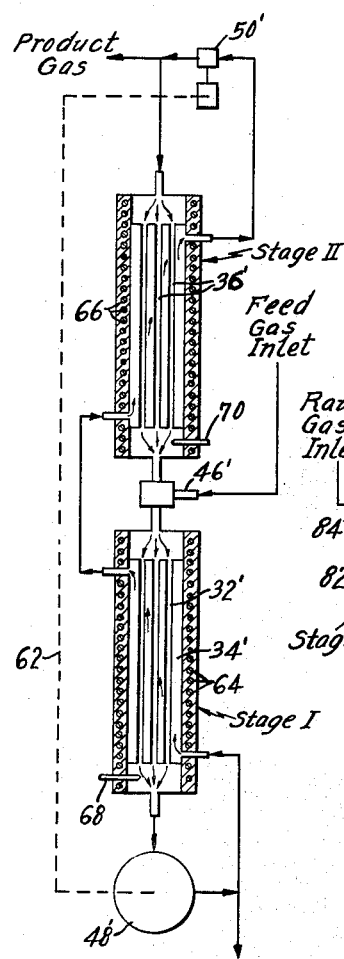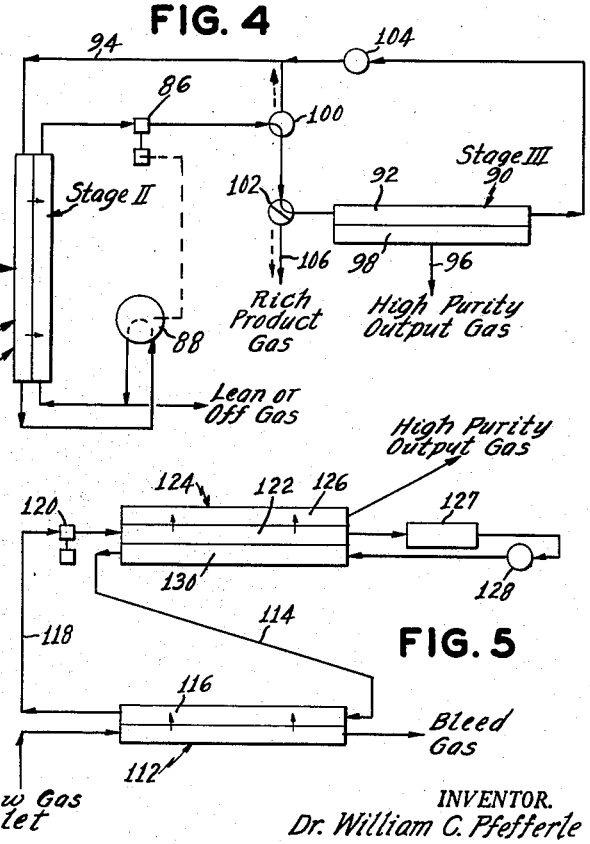

3,144,313
DIFFUSION PURIFICATION OF GASES
William C. Pfefferle, Middletown, N.J., assignor, by mesne assignments, to Engelhard Industries, Inc., Newark, N.J., a corporation of Delaware
Filed Apr. 1, 1960, Ser. No. 19,393
6 Claims. (Cl. 55—16)

This invention relates to diffusion purification, and more particularly to gas recovery methods and apparatus utilizing the selective diffusion properties of specific gases and materials employed as diffusion membranes.

To obtain hydrogen of high purity, commercially available hydrogen may be diffused through palladium. One suitable apparatus for this purpose is disclosed in R. B. Green et al. Patent No. 2,911,057, granted November 3, 1959. Highly selective diffusion also occurs by the diffusion of helium and oxygen through the lattice of silica and silver, respectively. Diffusion which is less selective but at higher rates occurs through the pores of other materials, rather than through the lattice.

In the case of gas streams containing lower percentages of hydrogen or helium, the commercial application of selective diffusion principles has not been practical with available techniques. Thus, for example, a conventional hydrogen purification unit would normally include a number of parallel palladium tubes which form the diffusion "membrane." These tubes are interconnected at both ends to form the input chamber, and the raw gas is passed through the tubes. The recovery chamber encloses the tube and normally has but a single connection, an outlet for the purified hydrogen. When a stream containing 10 percent or less of hydrogen is applied to the input chamber of the device, if fifty percent of the hydrogen is recovered, the percentage of hydrogen at the exhaust end of the input chamber will be only five percent. The partial pressure of hydrogen at the exhaust from the input chamber is then only one-twentieth of the total pressure. With only one connection, the recovery chamber is all at a single low pressure. Assuming that the recovery chamber pressure is atmospheric (14.6 pounds per square inch), and that the difference in partial pressure across the palladium tubes of hydrogen toward the exhaust end of the tubes is 5 or 6 lbs. per square inch, then the partial pressure of hydrogen at the exhaust end of the input chamber is 20 p.s.i., and the total pressure in the input chamber must be 400 lbs. per square inch.

The foregoing example illustrates some of the problems faced with conventional techniques. Note that even with an input pressure approaching the maximum which thin palladium tubes can withstand, only fifty percent recovery is practical. In many cases vacuum pumps have been employed to reduce the pressure in the recovery chamber; however, vacuum systems are expensive and require time-consuming maintenance.

An important object of the present invention is to improve and simplify techniques and apparatus for the diffusion recovery of gases which are only available in relatively low concentrations.

Another object of the present invention is to remove and collect practically all of a selected low concentration gas component from a gas stream by diffusion method without using a vacuum recovery system.

In accordance with an important aspect of the present invention, the foregoing objects may be realized by the use of a countercurrent flow technique in the input and recovery chambers of a diffusion purification system. Thus, in the case of a diffusion purifier using a series of paralleled palladium tubes, the input gas stream may flow from the inlet end of the tubes to the outlet end of the tubes. In the recovery chamber enclosing the tubes, both an input and an outlet are provided, and the direction of gas flow is from the outlet end of the tubes to the inlet end of the set of tubes, in opposition to the direction of flow within the tubes. Within the tubes, the concentration of hydrogen decreases along the length of the tubes from the inlet to the outlet end. In the recovery chamber enclosing the tubes, the concentration of hydrogen increases from the input to the recovery chamber at the outlet end of the set of tubes along their length toward the outlet from the recovery chamber. The "stripper" gas applied to the inlet of the recovery chamber at the outlet end of the set of tubes may have a suitably low proportion of hydrogen or may not include any hydrogen. However, the partial pressure of hydrogen both inside and outside of the palladium tubes increases along the length of the tubes from the outlet end to the inlet end of the tubes. Furthermore, with the stripper gas present, the total pressure difference across the palladium tube walls is reduced.

In one specific embodiment of the invention, a portion of the gas from the exit of the input chamber of the diffusion unit is passed through a pressure reducer and is supplied to the inlet to the recovery side of the diffusion unit.

Two stage systems of various types may be employed. In one illustrative arrangement, two palladium diffusion units were used, and the purified hydrogen from the recovery section of the first diffusion unit was supplied to the recovery section of the second stage of the second diffusion unit. A portion of the output gas from the recovery section of the second unit was recycled at increased pressure through the input section of the second stage. Following reduction in hydrogen content in passing through the input chamber of the second stage, the reflux gas was combined with the raw input gas having approximately the same low concentration of hydrogen and fed back into the input of the first stage.

In accordance with another illustrative embodiment of the invention, two stages of purification are employed, and a condensable gas is employed as the countercurrent stripper gas in the recovery section of the first stage. The second stage is a combination diffuser and condenser. More specifically, the gas to be recovered is diffused through a membrane from an inlet chamber in which the stripper gas is simultaneously condensing. The stripper gas in liquid form is permitted to expand into an evaporation chamber which is physically in contact with the inlet chamber. With the evaporation chamber in thermal contact with the input chamber, the latent heat of condensation of the condensing vapor in the input chamber is absorbed by the evaporating liquid in the adjacent chamber. No diffusion occurs between the evaporation chamber and the other two chambers of the second stage. The evaporated liquid is then fed back as stripper gas to the inlet of the recovery chamber in the first stage of this embodiment of the invention.

In accordance with a broad feature of the invention, therefore, a countercurrent gas purification unit includes input and recovery chambers separated by a diffusion membrane having a high diffusion rate for a selected gas to be purified, arrangements are provided for passing gas including the gas to be purified through the input chamber in one direction, and arrangements are also provided for passing gas through the recovery chamber in the opposite direction.

In accordance with a collateral feature of the invention, a pressure reducer may be connected between the input and recovery chambers of the diffusion unit described in the preceding paragraph.

In accordance with an additional feature of the invention, two units as set forth in the first feature of this invention are coupled together with raw gas being supplied at high pressure to the input of the first of said two units, and output gas from the first unit being supplied to the recovery section of the second unit. In addition, a portion of the purified output gas from the second stage of the system is coupled through a compressor to the input chamber of the second stage, and is combined with the raw gas input to the first diffusion unit after reduction in concentration in the second stage.

In accordance with another feature of the invention, two diffusion purification stages are provided, and both of the stages include input and recovery chambers and a diffusion membrane. Enriched gas from the countercurrent recovery section of the first stage is supplied to the second stage, and arrangements are provided for recirculating at least a portion of the stripped gas from the second stage back to the first stage. The second stage may be a countercurrent flow stage like the first stage, as set forth in the preceding paragraph. Alternatively, the second stage may have enriched gas from the first stage applied to its input chamber. In this latter case, it may include special arrangements for condensing the stripper gas to increase the average partial pressure of the gas to be purified in the input chamber of the second stage.

In accordance with a further feature of this invention, the various diffusion apparatus as described above may be provided with arrangements for avoiding significant "back-mixing." Back-mixing is avoided by providing relatively narrow cross-sections in the diffusion chambers, and by employing relatively fast but non-turbulent gas flow rates.

Other objects, features, and certain advantages of the invention will be readily apprehended from a consideration of the following detailed description and the drawings, in which, FIG. 1 is a simplified block diagram of a diffusion unit in accordance with the present invention;

FIG. 2 is a block diagram of a two-stage system in accordance with the present invention in which higher purification may be obtained;

FIG. 3 is a diagrammatic representation of a more complete form of the system of FIG. 2;

FIG. 4 is an alternative representation of the systems of FIGS. 2 and 3; and

FIG. 5 shows a two-stage embodiment of the invention in which a readily condensable stripper gas is employed.

With reference to the drawings, FIG. 1 is a schematic showing of a one-stage diffusion purification unit in accordance with the present invention. In the present discussions, attention will be directed to the purification of hydrogen by diffusion through palladium. As discussed below, however, the principles of the invention are applicable to other selective diffusion purification phenomena. In FIG. 1, raw gas containing about 10 percent hydrogen gas is applied to inlet tube 12. The diffusion purification unit 14 includes an input chamber 16 and a recovery chamber 18. In actual practice, the inlet chamber may comprise a large group of parallel palladium or palladium silver alloy tubes. The recovery chamber may enclose the palladium tubes so that gas diffused through the tubes is collected in the recovery chamber. The diffusion unit may be maintained at a temperature several hundred degrees centigrade by means of a heating coil, or the like.

The raw inlet gas must, of course, be at a higher pressure than the gas in the recovery chamber 18. More specifically, in order to get diffusion through the palladium "membrane" 20, the partial pressure of hydrogen in the gas on the two sides of membrane 20 must be significantly different. As will be set forth in detail below, the use of countercurrent flow in the input and recovery chambers is most helpful in maintaining an appreciable difference in partial pressures along the length of the membrane without excessive total pressure drop across the membrane. With regard to the use of the term "membrane," this refers to the palladium tubes or to any other suitable structure which may be used as the diffusion element.

In one representative example, the raw gas included 10 percent hydrogen and 90 percent nitrogen at a pressure of 365 lbs. per square inch, and was applied to a palladium tube diffusion unit at a rate of 1.9 liters per minute. The pressure reducer 22 brought the pressure in the recovery side of the unit down to 45 lbs. per square inch. The gas passing through the pressure reducer was composed of approximately 0.26 percent hydrogen and 99.74 percent nitrogen. The partial pressure of a gas may be determined by multiplying the percentage of the gas which is present by the total pressure. The partial pressure of hydrogen at the output of the inlet chamber 16 was therefore approximately 1 lb. per square inch. Similarly, the partial pressure of hydrogen in the gas applied to the input to the recovery chamber 18 was approximately .12 lb. per square inch. At the output tube 24 from the recovery chamber 18, the concentration of hydrogen was 47 percent as compared with 53 percent nitrogen. The flow was approximately 0.4 liter per minute. It may also be noted that the partial pressures of hydrogen in the input and recovery chambers at the left hand end of the unit as shown in FIG. 1, were about 36 and 21 lbs. per square inch, respectively.

An interesting point to be noted is that the partial pressure of hydrogen at the outlet end of the recovery chamber is much greater than the partial pressure of hydrogen at the outlet from the input chamber at the other end of the diffusion unit 14. With a single outlet from the recovery side and no countercurrent flow, note that the recovery chamber would necessarily be at a single hydrogen partial pressure, with the resulting difficulties described in the introduction of this specification.

In the example described above in connection with FIG. 1 of the drawing, the purity of hydrogen has been increased from 10 percent to 47 percent. In addition, 97 percent of the hydrogen has been recovered. Additional stages may readily be employed as described below for further purification of the hydrogen.

The arrangement of FIG. 2 includes two stages identified as Stage I and Stage II. The first stage includes an input chamber 32 and a recovery chamber 34. Similarly, Stage II includes an input chamber 36 and recovery chamber 38. The Stage I and Stage II diffusion units also include diffusion membranes 40 and 42, respectively. In addition, arrangements may be provided for heating the diffusion units to a temperature of several hundred degrees centigrade to speed up the diffusion action.

Stage I in the system of FIG. 2 operates in much the same manner as the single stage shown in FIG. 1. The principal difference is the combination of the off-gas supplied from Stage III on line 44 with the raw gas on line 46 at the inlet to the input chamber 32 of Stage I. Advantageously, these two gas streams should have substantially the same concentration at the point where they are combined.

Now, in one illustrative embodiment of the invention, the inlet chambers 32 and 36 operate at a pressure of approximately 365 lbs. per square inch. The recovery sections 34 and 38 operate at a lower pressure of about 45 lbs. per square inch. The pressure reduction is accomplished by the unit 48, and a compressor 50 is provided to increase the pressure of a portion of the product gas before application to the input section 36 of Stage II.

The proportion of the product gas which is recycled through compressor 50 is normally at least several times greater than the amount of product gas which is withdrawn from output line 52. With this arrangement, the concentration of hydrogen is progressively increased from approximately 10 percent at input line 46, up to about 50 percent on line 54 interconnecting Stages I and II, to approximately 95 percent hydrogen at output line 52. The off-gas on line 56 contains less than 0.01 percent of hydrogen. Accordingly, the recovery of hydrogen is greater than 99.99 percent.

With regard to the amount of product gas which is recycled through compressor 50, it will be higher or lower depending on the concentration of hydrogen desired in the product gas. When higher purities are desired, the amount of reflux gas may be up to one hundred or more times greater than the output of product gas from line 52. When the concentration requirements are low however, a reflux gas to product gas ratio of two or three, may be adequate.

In one representative case in which the raw gas had a concentration of about 10 percent hydrogen and the product gas was about 95 percent hydrogen, the amount of reflux gas was approximately 1.15 liters per minute as compared with a total output from recovery section 38 of about 1.2 liters per minute. By subtraction, the flow of product gas was about .05 liter per minute. The ratio of reflux to net product gas was then about 23 to 1. The other flow rates were an input of .55 liter per minute on tube 46 and a flow of off-gas at the rate of about .5 liter per minute.

FIG. 3 shows the system of FIG. 2 in somewhat more elaborate structural form. In FIG. 3, the palladium tubes 32' provide the input chamber of Stage I of the diffusion unit corresponding to the chamber designated 32 in FIG. 2 of the drawings. Similarly, the recovery chamber 34' which encloses the palladium tubes 32' corresponds to the recovery chamber 34 of FIG. 2 of the drawings. In a similar manner, the other comparable components in FIG. 3 are designated by primed reference numerals corresponding to the unprimed reference numerals on corresponding components in FIG. 2. The dashed line 62 in FIG. 2 represents a mechanical link between the compressor 50' and the expander or pressure reducer 48'. In this way, the work expended in the expansion of gases may be employed to assist in the compression of gases at another point in the system. With this arrangement, a much lesser amount of power need be supplied to the compressor 50' than if the expander 48' were not connected to it.

In addition to the components shown in FIG. 2, the system of FIG. 3 shows the heating coils 64 and 66 encompassing the diffusion units of Stages I and II, respectively. Temperature sensing units 68 and 70 are also associated with Stages I and II. Signals from these temperature sensing units are applied to a control circuit in a known manner to regulate the current supplied to heating coils 64 and 66 to maintain the desired temperature, which may be in the order of 300 to 400° C. in the present case.

FIG. 4 is an alternative representation of the arrangement of FIGS. 2 and 3. In addition, a supplemental diffusion purification unit is provided for obtaining very high purity output gas. In the arrangement of FIG. 4, raw gas is supplied to the diffusion unit 82 on input line 84. The portion of the unit 82 above the input line 84 corresponds to Stage II of FIG. 3, whereas the portion of the diffusion unit below tube 84 corresponds to Stage I of the previous figure of the drawings. Similarly, the mechanically coupled compressor 86 and expander 88 correspond to the compressor 50' and the expander 48', respectively, of FIG. 3. In addition to the main diffusion unit 82, a supplemental diffusion unit 90, such as that disclosed in the patent of R. Green et al. cited above, may be provided. A portion of the rich product gas stream from the output of compressor 86 may be coupled to the input chamber 92 of the diffusion unit 90. After passing through chamber 92 where hydrogen is removed, the gas stream is coupled back to the inlet tube 94 to the input chamber of Stage II. With this arrangement, high purity output gas is available at line 96 connected to the recovery chamber 98 of the diffusion unit 90. Valves 100, 102 and 104 are provided to permit bypassing of Stage III and the recycling of gas from compressor 86 to line 94. With this arrangement, as in FIGS. 2 and 3, a rich product gas of lower purity is available at line 106.

FIG. 5 of the drawings shows another embodiment of the invention in which two diffusion stages are employed. In FIG. 5, the first diffusion unit 112 is a countercurrent diffusion unit as described above in connection with FIG. 1. As a stripper gas, however, the system of FIG. 5 employs a gas which is readily condensable with a moderate increase in pressure and/or reduction in temperature. The input gas supplied on line 114 to the recovery chamber 116 of the diffusion unit 112 is low in hydrogen content. At the output tube 118 from the recovery chamber 116, however, the gas is relatively rich in hydrogen. Following compression in unit 120, it is sent to chamber 122 of unit 124. In chamber 122 the stripper gas is progressively condensed as the hydrogen diffuses through the permeable membrane into chamber 126. High purity hydrogen is withdrawn from 126.

The trap 127 separates the condensed stripper gas from uncondensed gases. To gasify the condensed stripper gas, the liquefied gas from the trap 127 is expanded in the unit 128 and applied to evaporation chamber 130. The cooling or heat absorbing effect of the evaporating liquid in chamber 130 helps to condense the gas in the adjacent chamber 122 of unit 124. After passing through the chamber 130, the stripper gas is fed back through tube 114 to the recovery chamber 116 of the first stage diffusion unit 112. This completes the recycling of the condensable stripper gas.

As a refinement to the system of FIG. 5, at least a portion of the hydrogen or helium which may be dissolved in the liquefied stripper gas may be recovered at the output of the expander 128. When the liquid is initially decompressed, the dissolved gas will evolve. It may then be separated by a simple column and coupled to line 118 at the input to the compressor 120.

In the arrangement of FIG. 5, hydrogen may be purified with a palladium type membrane, or helium with a silica membrane. The condensable stripper gas may, for example, be steam or cyclohexane. When using cyclohexane, unit 124 may conveniently be operated at temperature of about 185° C., in which case, chamber 130 will be operated at a pressure of about 140 p.s.i. Chamber 122 will be at pressure which exceeds the combined sum of the pressures of chambers 130 and 126. For completeness, the pressure in the input chamber of the first stage unit 112 may be about 500 p.s.i. The recovery chamber 126 may conveniently be operated at from 15 to 30 p.s.i.

In the foregoing description, our attention has been confined principally to the diffusion of hydrogen through palladium. Other selective diffusion processes are well known and are disclosed, for example, in an article entitled "Permeation of Gases Through Solids," reprinted from Journal of Applied Physics, vol. 28, No. 1, 34–39, January 1957. In particular, it is contemplated that helium and oxygen may readily be purified by diffusion through silica and silver, respectively, in all of the arrangements disclosed in this application. In addition, other selective diffusion phenomena which may be employed are disclosed in the foregoing article. Many of these may be used in all of the embodiments disclosed in this application.

It may be particularly noted that diffusion may take place through the lattice of the material itself, as in the specific examples mentioned above, or may take place through porous materials, which contain small gas passages through the material. Diffusion through such pores takes place at a rate which is inversely proportional to the square root of the molecular weight of the gas. While diffusion through porous materials is less selective than through the lattice of materials, it occurs at higher rates of flow, and when a very light gas, such as hydrogen, is to be separated from much heavier gases, adequate selectivity may be obtained. Lower selectivities must also be tolerated, in some cases. Porous materials which may be used as diffusion barriers include nickel, bronze, stainless steel, porous iron powder metallurgy products, graphite, and porous ceramics, for example. The present invention may utilize either types of diffusion phenomena, e.g. diffusion through the lattice of the material itself, or diffusion through pores in membranes. However, in the particular embodiments shown in the present disclosure, diffusion through the lattice is preferred for the high selectivity and high purity of the resultant gas.

In the foregoing description, the term "partial pressure" has frequently been used. It is to be understood that certain allowances must be made for deviations of specific gases from ideal behavior, as discussed in the literature.

It is to be understood that the above described arrangements are illustrative of the application of the principles of the invention. By way of example, but not of limitation, the diffusion membrane may have a disk type or other geometrical configuration, with the flow of gas in the recovery chamber being countercurrent to that in the input chamber in each case; hydrogen may be purified by diffusion through palladium or palladium alloys from a liquid in which the hydrogen is dissolved; and binary gases, such as hydrogen and helium, may be purified together by selective diffusion through an appropriate membrane, such as silicon. Numerous other arrangements may be devised by those skilled in the art without departing from the spirit and scope of the invention.

What is claimed is:

1. A countercurrent gas purification system comprising a diffusion unit having input and recovery chambers separated by a diffusion membrane having a high diffusion rate for a selected gas to be purified, means for passing gas including the selected gas through said input chamber in a predetermined direction with respect to said membrane, means separate from the diffusion unit for reducing the pressure of gas from said input chamber, and means for passing a portion of the gas of reduced pressure from said pressure reduction means through said recovery chamber in a direction opposite to said predetermined direction with respect to said membrane.

2. A diffusion type gas recovery system comprising first and second diffusion units each including input and recovery chambers separated by a diffusion membrane having a high diffusion rate for a selected gas to be purified, means for passing gas including the selected gas through the input chamber of each of said units in a given direction, means for passing gas through the recovery chamber of the first of said units in the opposite direction with respect to said membrane, means for supplying enriched gas from the recovery chamber of said first unit to said second unit, an evaporation chamber also included in said second unit, means for condensing the stripper gas as it is applied to the input chamber of the second unit, means for supplying the liquefied stripper gas to the evaporation chamber under reduced pressure, and additional means for recirculating at least a portion of the stripper gas from the evaporation chamber of said second unit to the recovery chamber of said first unit.

3. A method for separating a selected gas constituent from a gas mixture, which comprises passing the gas mixture through an input zone of a diffusion unit in a predetermined direction with respect to a non-porous diffusion membrane, the selected gas constituent diffusion through the lattice of the material of the membrane into a recovery zone at the other side of the membrane, withdrawing the gas having a lower content of the selected gas constituent from the input zone and releasing the pressure of the withdrawn gas, and passing a portion of the withdrawn gas of lower pressure through the recovery zone in a direction opposite to said predetermined direction of the gas mixture passing through the input zone and along the diffusion membrane.

4. The method of claim 3 wherein the gas constituent to be separated is hydrogen and the diffusion membrane is of palladium.

5. A method for separating a selected gas constituent from a gas mixture, which comprises passing the gas mixture through an input zone of a first diffusion unit in a predetermined direction with respect to a non-porous diffusion membrane, the gas constituent selectively diffusing through the lattice of the material of the membrane into a recovery zone at the other side of the membrane, withdrawing the gas having a lower content of the selected gas constituent from the input zone, passing a stripper gas through the first unit recovery zone in an opposite direction with respect to the direction of the gas passing through the input zone, withdrawing the stripper gas enriched in the selected gas constituent from the first unit recovery zone and passing the enriched stripper gas to a second diffusion unit, passing a gas mixture containing the selected gas constituent to be separated through an input zone of a second diffusion unit in a predetermined direction with respect to another non-porous diffusion membrane, the gas constituent selectively diffusing through the lattice of the material of the membrane into a recovery zone of the second unit at the other side of the membrane, passing a stripper gas through the second unit recovery zone in an opposite direction with respect to the direction of the gas passing through the input zone, withdrawing the stripper gas enriched in the selected gas constituent from the second unit recovery zone, and withdrawing gas of lower content of the selected gas constituent from the second unit input zone and recirculating, after releasing the pressure of the withdrawn gas, at least a portion of the gas of lower pressure to the first diffusion unit.

6. A diffusion type gas recovery system comprising first and second stage diffusion units each including input and recovery chambers separated by a diffusion membrane having a high diffusion rate for a selected gas to be purified, means for passing gas including the selected gas through the input chamber of each unit in a given direction, means for passing a stripper gas through the recovery chamber of the first of said units in the opposite direction with respect to the direction of the gas passing through the input chamber and along the surface of the diffusion membrane, the second unit also including an evaporation chamber adjacent the input chamber, and means for condensing the stripper gas exclusive of said selected gas from the first unit recovery chamber as it is supplied to the second unit input chamber, said selected gas diffusing through the diffusion membrane into the recovery chamber of the second unit with the liquid stripper gas remaining in the second unit input chamber, means for supplying enriched gas including stripper gas from the recovery chamber of the first unit to the second unit input chamber, additional means for conducting the liquefied stripper gas from the second unit input chamber to the evaporation chamber under reduced pressure whereby the liquefied stripper gas evaporates in the evaporation chamber with a heat absorptive cooling of the stripper gas in the adjacent input chamber to aid in condensing the stripper gas exclusive of said selected gas in the input chamber, and means for recirculating at least a portion of the gas depleted of the selected gas from the second unit evaporation chamber to the first unit recovery chamber.

References Cited in the file of this patent

UNITED STATES PATENTS

| | | |
|---|---|---|
| 2,589,297 | Schwertz | Mar. 18, 1952 |
| 2,609,059 | Benedict | Sept. 2, 1952 |
| 2,699,836 | Barton | Jan. 18, 1955 |
| 2,773,561 | Hunter | Dec. 11, 1956 |
| 2,924,630 | Fleck et al. | Feb. 9, 1960 |
| 2,944,627 | Skarstrom | July 12, 1960 |
| 2,950,778 | Boettcher et al. | Aug. 30, 1960 |
| 2,966,235 | Kammermeyer | Dec. 27, 1960 |
| 3,019,853 | Kohman et al. | Feb. 6, 1962 |

UNITED STATES PATENT OFFICE
CERTIFICATE OF CORRECTION

Patent No. 3,144,313                                August 11, 1964

William C. Pfefferle

It is hereby certified that error appears in the above numbered patent requiring correction and that the said Letters Patent should read as corrected below.

Column 5, line 50, for "to" read -- or --; column 7, line 63, for "diffusion" read -- diffusing --.

Signed and sealed this 8th day of December 1964.

(SEAL)
Attest:

ERNEST W. SWIDER                              EDWARD J. BRENNER
Attesting Officer                                    Commissioner of Patents